United States Patent [19]

Lin

[11] Patent Number: 4,977,820
[45] Date of Patent: Dec. 18, 1990

[54] BREWER FOR TEA OR COFFEE

[76] Inventor: Lung K. Lin, 2 Fl., No. 88, Cheng Fu Rd., Taipei, Taiwan

[21] Appl. No.: 482,547

[22] Filed: Feb. 21, 1990

[51] Int. Cl.$^5$ ............................................. A47J 31/18
[52] U.S. Cl. .................................... 099/323; 99/306; 206/000.5; 210/474
[58] Field of Search ................ 99/306, 323, 316, 317; 206/000.5; 426/77, 78, 81, 82, 433, 435; 220/23.83; 210/474

[56] References Cited

U.S. PATENT DOCUMENTS

| | | | |
|---|---|---|---|
| 1,780,957 | 11/1930 | Veder | 220/23.83 |
| 2,732,787 | 1/1956 | Osborne | 99/306 |
| 3,181,951 | 5/1965 | Gronvold | 426/435 |
| 3,219,226 | 11/1965 | Schroeder | 220/23.83 |
| 3,429,254 | 2/1969 | Rosen | 206/0.5 |
| 4,345,512 | 8/1982 | Moore | 99/323 |

Primary Examiner—Robert W. Jenkins
Attorney, Agent, or Firm—Staas & Halsey

[57] ABSTRACT

A brewer includes a container having an open upper end and a retainer being a cup of reduced size. An outward flange is formed on an upper end of the retainer. An annular flange with two notches is formed on a lower end of the retainer. A number of holes are formed in a peripheral surface and a bottom of the retainer. The notches are engagable with one side of the open upper end of the container and the outward flange is engagable with an other side of the open upper end of the container so that the retainer is inclinably supported on top of the container.

2 Claims, 4 Drawing Sheets

BREWER FOR TEA OR COFFEE

BACKGROUND OF THE INVENTION

The present invention relates to a brewer, and more particularly to a brewer for tea or coffee.

Tea has become a very popular drink. Normally, the tea is brewed in boiled water, in which the tea is directly deposited into the bottom of a cup or a brewer and then the boiled water is poured into the cup. The tea may become very strong so that it is not good for drink after a long brew.

A retainer or a filter is developed. The tea is deposited in the retainer which is readily removably provided in top of the brewer. The lower portion of the retainer is communicated with inside of the brewer so that the tea in the retainer is brewed by the boiled water in the brewer. After a suitable time for brew, the retainer is removed and should be placed on a desk or the like. The water remained in the retainer may splash everywhere on the desk.

The present invention has arisen to mitigate and/or obviate the afore-described disadvantages of the conventional tea cup or brewer.

SUMMARY OF THE INVENTION

The primary objective of the present invention is to provide a brewer for tea or coffee, in which the retainer can be supported on top of the brewer so that the tea in the retainer can be separated from the water in the brewer and so that the water remained in the retainer can flow into the brewer.

In accordance with one aspect of the invention, there is provided a brewer for tea or coffee which includes a container having an open upper end and a retainer being a cup of reduced size. An outward flange is formed on an upper end of the retainer. The retainer is removably supported in an upper portion of the container by the outward flange. An annular flange is formed on a lower end of the retainer. Two notches are formed in the annular flange. A number of holes are formed in a peripheral surface and a bottom of the retainer. The notches of the retainer are engagable with one side of the open upper end of the container and the outward flange of the retainer is engagable with an other side of the container so that the retainer is inclinable supported on top of the container.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
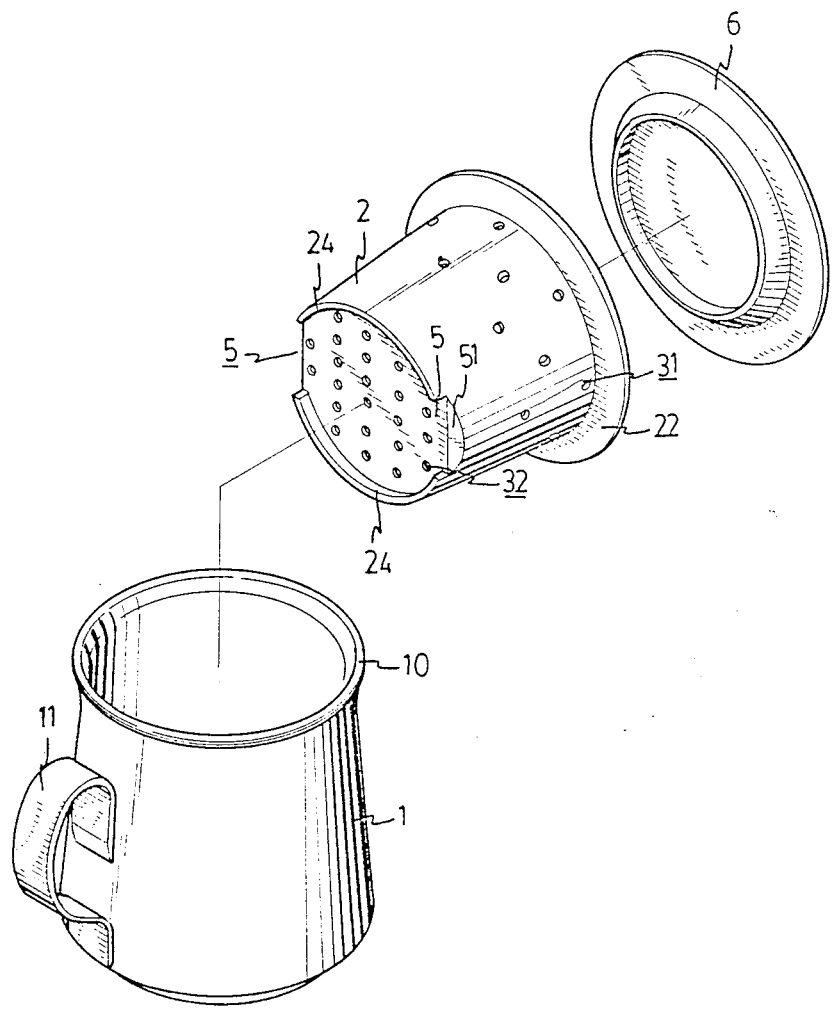
FIG. 1 is an exploded view of a brewer for tea or coffee in accordance with the present invention.
Figure 2:
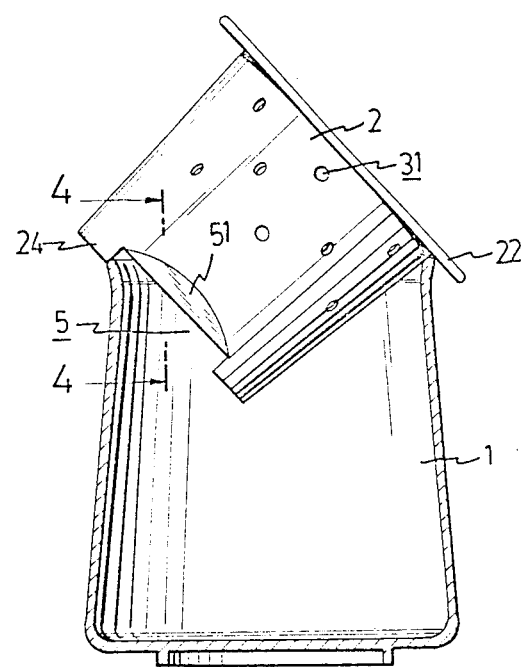
FIG. 2 is a vertical cross sectional view of the brewer of FIG. 1, in which the retainer is supported on top of the brewer.

Referring to the drawing and initially to FIGS. 1 and 2, the brewer for tea or coffee in accordance with the present invention comprises generally a container 1, a retainer 2 and a laid 6. The container 1 is substantially a cup or the like with an ear or a lug 11 provided on one side thereof. The lip portion 10 of the container 1 preferably turns outwards.

The retainer 2 is substantially a cup of reduced size with an outward flange 22 provided on a top end thereof so that the retainer 2 can be supported in an upper portion of the container 1 by the flange 22. Tea or coffee is received in the retainer 2. A filter paper or the like is inserted into the retainer before the coffee is deposited into the retainer 2. The lid 6 is removably provided on top of the retainer 2 to close an open upper end of the retainer 2 and the container 1. A plurality of holes 31 are formed in the peripheral surface of the retainer 2 and a plurality of holes 32 are formed in the bottom surface of the retainer 2 so that the inside of the retainer 2 is communicated with the inside of the container 1 when the retainer 2 is inserted into the upper portion of the container 1. An annular flange 24 is formed on a bottom of the retainer 2 and extends downward. Two notches 5 are symmetrically formed in the annular flange 24 and opposite with each other. A surface 51 in each notch 5 is preferably inclined.

Figure 3:
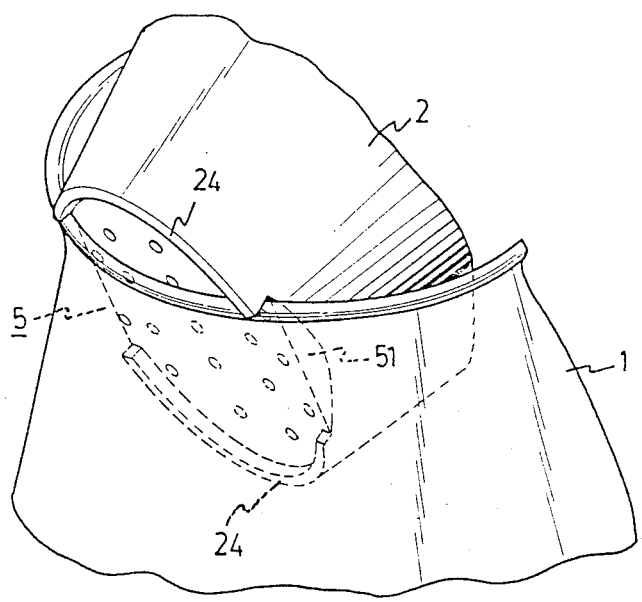
FIG. 3 is a partial perspective view of the brewer, illustrating an engagement of the retainer with the brewer.
Figure 4:
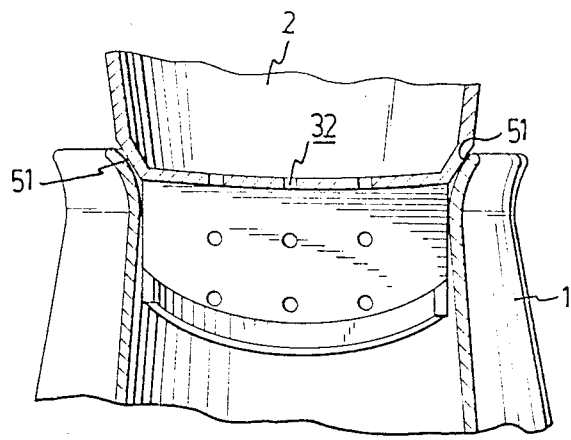
FIG. 4 is a partial cross sectional view of the brewer, taken along the lines 4—4 of FIG. 2.

Referrring next to FIGS. 2, 3 and 4, the notches 5 of the retainer 2 is engagable with one side of the lip 10 of the container 1 and the outward flange 22 of the retainer 2 is engagable with the other side of the lip 10 so that the retainer 2 is inclinably supported on top of the container 1 and so that the tea or coffee in the retainer 2 can be separated from the water in the container 1. The water remained in the retainer 2 drops into the container 1 through the holes 31, 32. As shown in FIGS. 3 and 4, the upper ends of the inclined surfaces 51 of the retainer 2 contact and bear against the inner surface of the lip of the container 1. The water remained in the retainer 2 flows along the inclined surfaces 51 into the container 1.

Accordingly, the retainer 2 in accordance with the present invention can be supported on top of the container 1 and does not need to be removed until the water remained in the retainer 2 fully flows into the container so that the water will not splash the desk.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brewer comprising a container being substantially a cup having an open upper end; and a retainer being substantially a cup of reduced size, an outward flange being formed on an upper end of said retainer, said retainer being removably supported in an upper portion of said container by said outward flange, an annular flange being formed on a lower end of said retainer, two notches being formed in said annular flange, a plurality of holes being formed in a peripheral surface and a bottom of said retainer; and said notches of said retainer being engagable with one side of said open upper end of said container and said outward flange of said retainer being engagable with an other side of said open upper end of said container so that said retainer is inclinably supported on top of said container.

2. A brewer according to claim 1, wherein a surface in each said notch of said retainer is inclined.

* * * * *